(12) United States Patent
Hinze et al.

(10) Patent No.: US 10,243,496 B2
(45) Date of Patent: Mar. 26, 2019

(54) METHOD AND DEVICE FOR CONTROLLING THE OPERATION OF AN ELECTRIC MOTOR

(71) Applicant: CONTI TEMIC MICROELECTRONIC GMBH, Nuernberg (DE)

(72) Inventors: Patrick Hinze, Winkelhaid (DE); Andreas Schulze, Lauf A. D. Peg./ Ot Neunhof (DE); Matthias Peuckert, Regensburg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 116 days.

(21) Appl. No.: 15/324,131

(22) PCT Filed: Jun. 9, 2015

(86) PCT No.: PCT/EP2015/062813
§ 371 (c)(1),
(2) Date: Jan. 5, 2017

(87) PCT Pub. No.: WO2016/005129
PCT Pub. Date: Jan. 14, 2016

(65) Prior Publication Data
US 2017/0187312 A1    Jun. 29, 2017

(30) Foreign Application Priority Data
Jul. 8, 2014   (DE) .................. 10 2014 213 199

(51) Int. Cl.
*H02P 21/22* (2016.01)
*H02P 6/08* (2016.01)
*H02P 6/12* (2006.01)
*H02P 9/10* (2006.01)
*H02P 21/05* (2006.01)

(52) U.S. Cl.
CPC .............. *H02P 21/22* (2016.02); *H02P 6/085* (2013.01); *H02P 6/12* (2013.01); *H02P 9/10* (2013.01); *H02P 21/05* (2013.01)

(58) Field of Classification Search
CPC ............. H02P 6/08; H02P 21/02; H02P 23/28
See application file for complete search history.

(56) References Cited

U.S. PATENT DOCUMENTS

| | | |
|---|---|---|
| 4,602,201 A | 7/1986 | Edwards |
| 5,519,301 A | 5/1996 | Yoshida et al. |

(Continued)

FOREIGN PATENT DOCUMENTS

| | | |
|---|---|---|
| CN | 101286727 A | 10/2008 |
| CN | 101295937 A | 10/2008 |

(Continued)

*Primary Examiner* — Bickey Dhakal
*Assistant Examiner* — Charles S Laughlin
(74) *Attorney, Agent, or Firm* — Laurence A. Greenberg; Werner H. Stemer; Ralph E. Locher

(57) ABSTRACT

A method controls the operation of an electric motor. Wherein electrical voltages applied to electrical phases of the electric motor are produced and output in a controlled manner in a modulation on the basis of a rotor position of the electric motor, on the basis of a set point/actual comparison, which is performed in a control loop with a speed controller, for a speed of the electric motor and on the basis of a set point/actual comparison. A set point value at the input of the current regulator is formed by multiplying a present duty factor for the modulation by a first manipulated variable applied to the output of the speed controller. The first manipulated variable of the speed controller becomes an equivalent phase current root mean square value for the electric motor in the underlying current regulator by the multiplication by the present duty factor.

11 Claims, 5 Drawing Sheets

(56) References Cited

U.S. PATENT DOCUMENTS

| | | | |
|---|---|---|---|
| 5,631,812 A | 5/1997 | Sakano et al. | |
| 7,936,146 B2 * | 5/2011 | Hida | H02P 21/00 318/798 |
| 7,986,121 B2 * | 7/2011 | Hayashi | H02P 21/18 318/434 |
| 8,725,357 B2 | 5/2014 | Imamura et al. | |
| 8,994,317 B2 | 3/2015 | Akiyama et al. | |
| 9,490,722 B2 | 11/2016 | Sakakibara | |
| 2008/0265829 A1 * | 10/2008 | Hayashi | H02P 21/26 318/781 |
| 2013/0158808 A1 * | 6/2013 | Imamura | B62D 5/046 701/42 |
| 2013/0257319 A1 * | 10/2013 | Akiyama | H02P 27/06 318/139 |

FOREIGN PATENT DOCUMENTS

| | | |
|---|---|---|
| CN | 102971960 A | 3/2013 |
| CN | 103155401 A | 6/2013 |
| DE | 102010031435 A1 | 1/2012 |
| EP | 1981164 A2 | 10/2008 |
| JP | S59172989 A | 9/1984 |
| JP | 2007245763 A | 11/2012 |
| JP | 2013062913 A | 4/2013 |
| JP | 2013211985 A | 10/2013 |
| JP | 2014079154 A | 5/2014 |
| WO | 9408392 A1 | 4/1994 |
| WO | 9837493 A1 | 8/1998 |

* cited by examiner

METHOD AND DEVICE FOR CONTROLLING THE OPERATION OF AN ELECTRIC MOTOR

BACKGROUND OF THE INVENTION

Field of the Invention

The invention relates to a method and device for controlling the operation of an electric motor, specifically in the field of, or in an application for a vehicle transmission.

An electromechanically- or hydraulically-operated vehicle transmission comprises one or more electric motors for pump-operated or direct drive systems, wherein selector or switching devices, together with coupling and braking devices are controlled by means of the at least one electric motor.

Various methods are known from the prior art for controlling such electric motors in a vehicle transmission. On the grounds of cost, the power supply to the individual motor windings of electric motors is controlled by means of "block commutation" and a "B6 bridge circuit". By this arrangement, in a commutation step, a "high-side switch" in a half-bridge of the bridge circuit and a "low-side switch" of the half-bridge are actuated. The commutation step is controlled with reference to a rotor position of the electric motor wherein, for example, Hall sensors are provided in the electric motor for the detection of the rotor position. The Hall sensors are arranged such that, by means of the high-low logic level, an electrical angular resolution of 60° can be achieved.

In order to increase this angular resolution, the employment of high-resolution angular sensors is known. This permits the superior adaptation of the voltage outputs on the electrical phases of the electric motors to a respective rotor position. The "sinusoidal commutation" thus achieved permits the more effective utilization of the efficiency of the electric motor, with simultaneously quiet running. By this arrangement, the electric voltage is generated with reference to information on a rotor angle, by means of space vector modulation, such that the resulting voltage is sinusoidal.

To further enhance the efficiency of an electric motor with sinusoidal commutation, it is known that a maximum current in the motor windings can be synchronized with the position of the rotor magnets, such that a fixed offset of 90° is achieved. To this end, "field-oriented control" is employed, wherein phase currents of the electric motor, in conjunction with information on the rotor position, are used to control output phase voltages.

BRIEF SUMMARY OF THE INVENTION

The object of the invention is the disclosure of an improved method and an improved device, in relation to the prior art, for the operation of an electric motor, specifically in the field of, or in an application for a vehicle transmission.

According to the invention, the object in respect of the method is fulfilled by the characteristics defined in the main method claim, and in respect of the device by the characteristics defined in the main device claim.

Advantageous configurations of the invention are described in the sub-claims.

In the method according to the invention for controlling an electric motor, specifically in the field of, or in an application for a vehicle transmission, electrical voltages applied to the electrical phases of the electric motor are generated and output in a controlled manner in a modulation on the basis of a rotor position of the electric motor, on the basis of a setpoint/actual comparison of the electric motor speed executed in a control loop by a speed controller, and on the basis of a setpoint/actual comparison of a total current measured on an electric power supply unit of the electric motor by a current regulator which is subordinate to the speed controller, wherein a setpoint value at the current regulator input is formed by multiplying a present duty factor for modulation by a first manipulated variable applied to the speed controller output, wherein the first manipulated variable of the speed controller becomes an equivalent phase current value for the electric motor in the subordinate current regulator, by means of multiplication by the present duty factor. The equivalent phase current value is the RMS value of the phase current.

The solution according to the invention permits the operation of the electric motor at a DC limit of a control device for controlling the electric motor, at a phase current limit of the electric motor or an electronic control unit, or at a current limit of an electricity system, specifically an on-board vehicle system, in which the electric motor is arranged. Accordingly, any speed requirements can be set on the electric motor from a higher level, without the need for the specific consideration of working points. The method permits the simple control of the maximum possible speed of the electric motor in accordance with an available electric current, and permits an independent motor phase current and/or DC limitation by means of a simple total current measurement. Moreover, in a specific manner, by the use of the total current as a setpoint value at the input of the current regulator, it is possible to employ the total current determined by the exceptionally simple and reliable measurement on the power supply unit as a control variable. Using the phase current information thus obtained, the optimum adjustment of working point-dependent pre-control angles for the optimization of the efficiency of the electric motor can be achieved, without the need for cost-intensive phase current feedback measurement.

In a further development of the invention, the duty factor, by the division of a second manipulated variable at the output of the current regulator control loop, is formed by a maximum available intermediate circuit voltage on the power supply unit. This determination can be achieved in a particularly straightforward manner, and is characterized by the offsetting of voltage supply variations by a high degree of reliability.

In a further potential configuration of the method, equivalent voltage amplitude on the electric motor is generated as a second manipulated variable by the current regulator, and the duty factor is thus generated in a simple manner by the division of the equivalent motor voltage by the intermediate circuit voltage.

According to a further development, the first manipulated variable is limited prior to multiplication with the duty factor for modulation. The equivalent RMS value of the motor phase current can thus be limited in a simple manner.

In another potential further development, the total current is limited. Specifically, the limitation of the total current setpoint value is achieved, prior to the multiplication of the present duty factor for modulation by the first manipulated variable present on the speed controller output, by converting the total current limit into an equivalent phase current limit by division with the present duty factor for modulation. The total current take-up of an electric power supply unit of the electric motor can thus be limited in a simple manner.

In a potential configuration of the method, in order to achieve very high angular resolution and, in consequence, exceptionally quiet running with a high motor efficiency utilization factor, voltages are determined with reference to a rotor position angle which is characteristic of a rotor position of the electric motor, in a space vector modulation.

The device according to the invention for controlling the operation of an electric motor comprises a power supply unit for the controlled output of electric voltages on electrical phases of the electric motor, wherein the supply unit is coupled to at least one detection unit for the detection of an electric motor rotor position, and to at least one speed controller, arranged in a control loop, for the execution of a setpoint/actual comparison of the electric motor speed. A current regulator is subordinate to the speed controller for the execution of a setpoint/actual comparison of a total current measured on the supply unit, wherein a multiplier is arranged on the speed controller output, by means of which a setpoint input value of the current regulator is obtained by multiplying the present duty factor for modulation with a first manipulated variable on the speed controller output, such that the first manipulated variable of the speed controller, by means of multiplication with the present duty factor in the subordinate current regulator, becomes the equivalent RMS phase current value.

By means of the device according to the invention, a maximum possible electric motor speed can simply be set with reference to the available electric current. The device thus permits independent motor phase current and/or DC limitation by means of a simple total current measurement in a power supply unit, for example in an output stage configured as a B6 bridge, and is characterized by an exceptionally simple and cost-effective structure, with exceptionally low computing power requirements.

In comparison with known field-oriented control devices from the prior art, the device can also be simply and cost-effectively configured, with no space-consuming and cost-intensive feedback current measurement components. Moreover, in a specific manner, by using the total current as a setpoint input value on the current regulator, it is possible to employ the total current determined by the exceptionally simple and reliable measurement on the power supply unit as a control variable. Using the phase current information thus obtained, the optimum adjustment of working point-dependent pre-control angles for the optimization of the efficiency of the electric motor can be achieved, without the need for cost-intensive phase current feedback measurement.

In a potential further development of the invention, a divider is arranged on the output of the current regulator, by means of which the duty factor is obtained by the division of a second manipulated variable present on the current regulator output by a maximum intermediate circuit voltage available on the power supply unit. The divider permits an exceptionally easily-achievable generation of the duty factor, and is characterized by high reliability, in that variations in the voltage supply can be compensated during the regulation of the electric motor.

In a potential configuration, the second manipulated variable is an equivalent voltage amplitude of the electric motor. The duty factor can thus be easily generated by means of the division of the equivalent motor voltage by the intermediate circuit voltage.

In a further potential configuration of the device, the supply unit incorporates a bridge circuit, for example a B6 bridge circuit, by means of which a block commutation of the electric motor can be achieved in a very simple and reliable manner.

Exemplary embodiments of the invention are described in greater detail hereinafter, with reference to the drawings.

DESCRIPTION OF THE INVENTION

In all the figures, mutually corresponding elements are marked with the same reference symbols.

Figure 1:
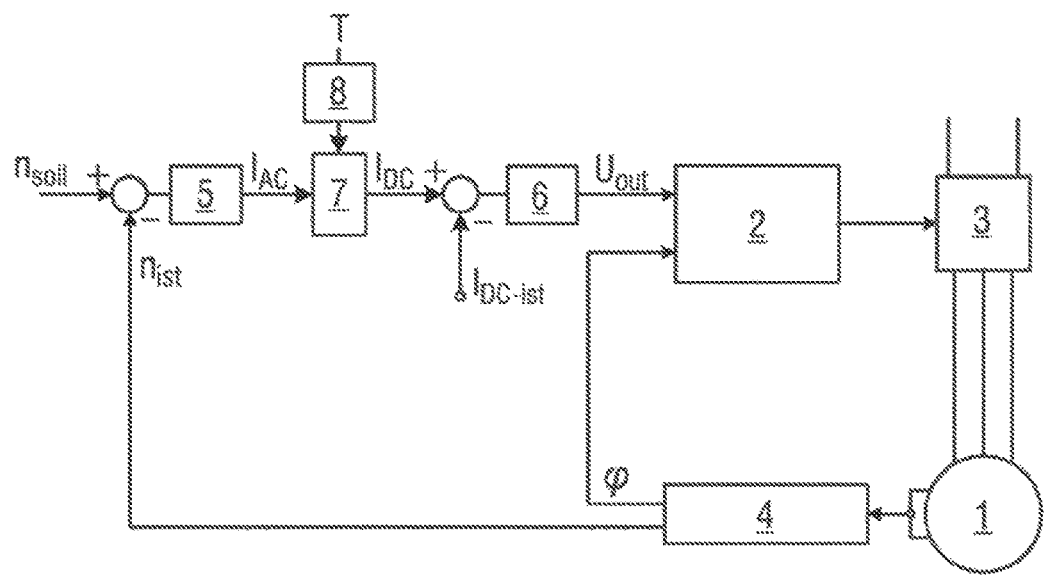
FIG. 1 shows a schematic block diagram of a first exemplary embodiment of a control loop for controlling an electric motor.

FIG. 1 shows a block circuit diagram of a potential first exemplary embodiment of a control loop for controlling an electric motor 1.

By block or sinusoidal commutation, a power supply to the individual motor windings of the electric motor 1 is thus controlled by a control unit 2 for controlling a B6 bridge 3 wherein, in a manner not shown in greater detail, at least one high-side switch in a half-bridge of the B6 bridge 3 and at least one low-side switch of the half-bridge are actuated in a pulse width modulation commutation step. The commutation step is controlled relative to a rotor position of the electric motor 1.

Moreover, an actual speed $n_{actual}$ of the electric motor 1 is determined by a detection unit 4 and fed back wherein, by multiplication relative to a setpoint speed $n_{setpoint}$ of the electric motor 1, an equivalent phase current RMS value of the electric motor 1 is defined as a first manipulated variable $I_{AC}$.

Moreover, by means of the detection unit 4, a rotor position angle φ which is characteristic of the rotor position of the electric motor 1 is detected and transmitted to the control unit 2 for space vector modulation which, from an amplitude of a voltage indicator, formed from a second manipulated variable of a current regulator 6 which is subordinate to the speed controller 5, and the rotor position angle φ, generates a control signal for the B6 bridge 3.

Thus, for controlling the operation of the electric motor 1, electric voltages on the electrical phases of the electric motor 1, by a modulation relative to the rotor position of the electric motor 1, relative to a comparison of the actual speed $n_{actual}$ with a setpoint speed $n_{setpoint}$ of the electric motor 1 executed by the speed controller 5, and relative to an actual/setpoint comparison of a total current $I_{DC\_actual}$ measured on a power supply unit of the electric motor 1 executed by the subordinate current regulator 6, are generated and output in a controlled manner.

A setpoint value $I_{DC}$ at the input of the current regulator 6 is formed by multiplying a present duty factor T for modulation by a first manipulated variable $I_{AC}$ on the output of the speed controller 5, by means of a multiplier 7 arranged on the output of the speed controller 5, as follows:

$$I_{DC} \approx I_{AC} \cdot T(0 \ldots 1) \quad (1)$$

wherein the duty factor T is transmitted to the multiplier 7 by a signal processing unit 8.

This delivers, prior to conversion by the duty factor T, an equivalent phase current on the electric motor 1 and, after conversion, a setpoint value $I_{DC}$ for the total current at the input of the current regulator 6. These two variables can be limited by comparison with adjustable maximum limits.

The set point total current value $I_{DC}$ thus generated is compared with the actual total current value $I_{DC\_actual}$, wherein the current regulator 6, by reference to this comparison, generates an equivalent voltage amplitude on the electric motor 1 as a second manipulated variable $U_{out}$.

The embodiment represented thus constitutes an extension of a simple control loop with a subordinate current regulator 6 for controlling electric motors 1, specifically in the transmission field or in a vehicle transmission application, which permits the limitation of the total current $I_{DC\_actual}$, and the generation of an equivalent phase current RMS value for the electric motor 1, wherein the only control variable employed is the easily-measurable total current $I_{DC\_actual}$ on the B6 bridge 3.

Figure 2:
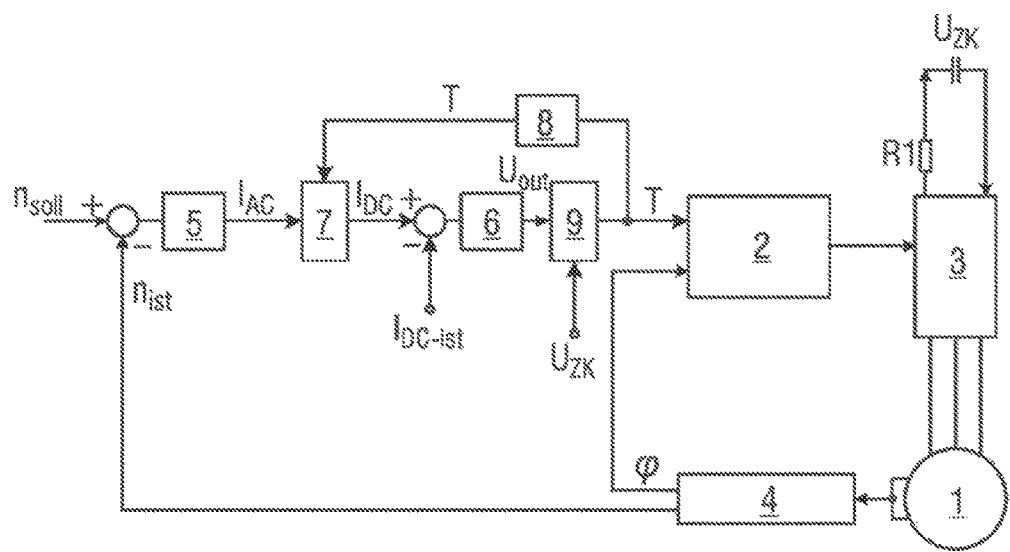
FIG. 2 shows a schematic block diagram of a second exemplary embodiment of a control loop for controlling an electric motor.

FIG. 2 shows a block circuit diagram of a potential second exemplary embodiment of a control loop for controlling an electric motor 1.

Unlike the first exemplary embodiment shown in FIG. 1, the duty factor T is formed by the division of the second manipulated variable $U_{out}$ on the output of the current regulator 6 by a maximum intermediate circuit voltage $U_{ZK}$ available on the B6 bridge 3. For the achievement of a high measuring accuracy, this intermediate circuit voltage $U_{ZK}$ is measured directly on the B6 bridge 3, as customary conductor systems and electrical components are susceptible to a substantial voltage drop at high currents. The total current $I_{DC\_actual}$ on an output stage which is configured, for example, as a B6 bridge 3, is also determined on an electrical resistance R1 on the B6 bridge 3.

By the feedback of the present duty factor T for modulation thus calculated by multiplication at the output of the speed controller 5, values for the total current $I_{DC\_actual}$ on the B6 bridge 3 and an equivalent phase current RMS value as a first manipulated variable $I_{AC}$ are available for separate control and limitation functions. In the exemplary embodiment represented, the total current $I_{DC\_actual}$ is employed as a setpoint value $I_{DC}$ for the subordinate current regulator 6.

Figure 3:
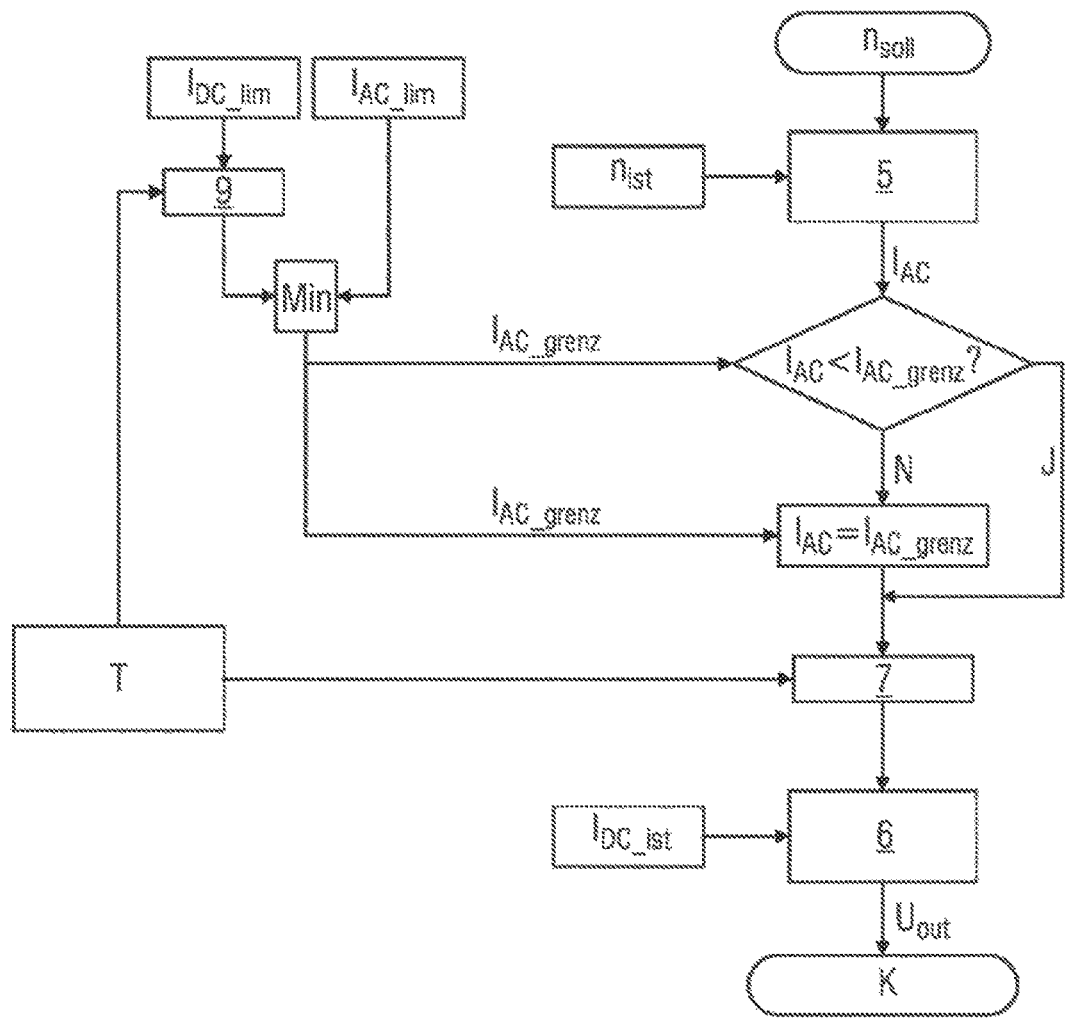
FIG. 3 shows a schematic flow chart of a method according to the invention, with a detailed representation of a limitation of a first manipulated variable on a speed controller of the control loop according to FIG. 1 or 2.

FIG. 3 shows a flow chart for a potential exemplary embodiment of the method according to the invention, with a detailed representation of a limitation of the first manipulated variable $I_{AC}$ on the speed controller 5, and of the setpoint value $I_{DC}$, wherein a total current limit $I_{DC\_limit}$ is converted into a current limit $I_{AC\_limit}$ for the first manipulated variable I.

Limit values $I_{DC\_lim}$, $I_{AC\_lim}$ are thus defined for the first manipulated variable $I_{AC}$ and the setpoint value $I_{DC}$, wherein the limit value $I_{DC\_lim}$ for setpoint value $I_{DC}$ is routed to the divider 9 with the present duty factor T. A current limit $I_{AC\_limit}$ is defined from the result of the division and the limit value $I_{AC\_lim}$ of the first manipulated variable $I_{AC}$, by a minimum calculation Min.

The first manipulated variable $I_{AC}$ is compared with this current limit $I_{AC\_limit}$, such that different paths in the flow chart, designated by reference symbols J and N, are selected according to the result of this comparison. If the first manipulated variable $I_{AC}$ exceeds the current limit $I_{AC\_limit}$, the first manipulated variable $I_{AC}$ is adjusted to the current limit $I_{AC\_limit}$.

The first manipulated variable $I_{AC}$, prior to multiplication with the duty factor T for modulation, is thus limited such that its maximum value does not exceed the current limit $I_{AC\_limit}$, wherein commutation K is executed by means of the control unit 2 and the B6 bridge 3, in accordance with the limitation applied.

Figure 4:
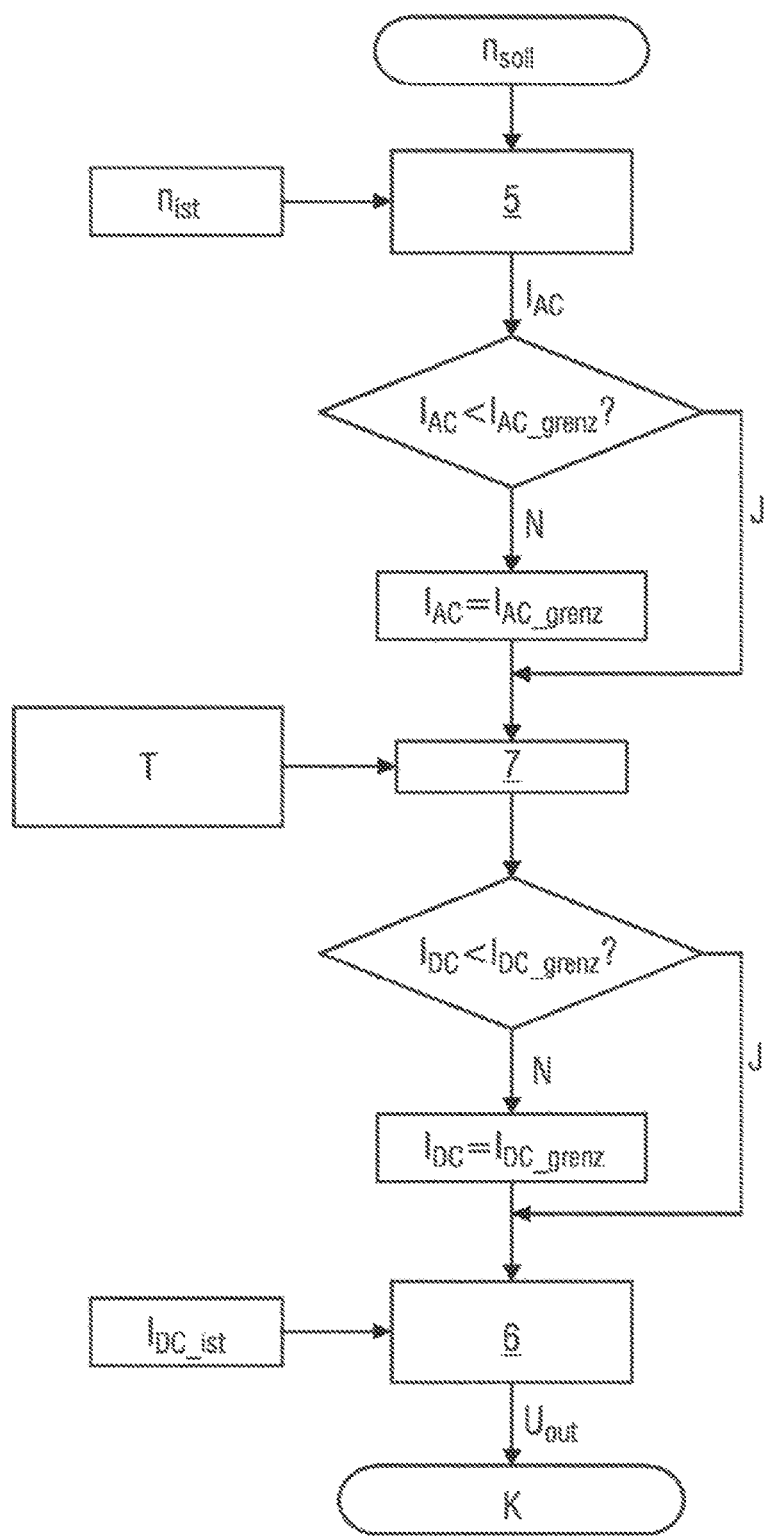
FIG. 4 shows a schematic flow chart of a method the invention, with a detailed representation of a limitation of a first manipulated variable on a speed controller, and of a limitation of a total current setpoint value on the control loop according to FIG. 1 or 2.

FIG. 4 shows a flow chart for a potential exemplary embodiment of the method according to the invention. Unlike the exemplary embodiment shown in FIG. 3, the limitation of the first manipulated variable $I_{AC}$ on the speed controller 5 and the limitation of the setpoint value $I_{DC}$ of the total current $I_{DC\_actual}$ are executed independently of each other.

The first manipulated variable $I_{AC}$ is thus firstly limited to the current limit $I_{AC\_limit}$, before it is checked whether the set point value $I_{DC}$ is smaller than a total current limit $I_{DC\_limit}$ generated from the limit value $I_{DC\_lim}$. If this is not the case, the setpoint value $I_{DC}$ is adjusted to the value of the total current limit $I_{DC\_limit}$.

The first manipulated variable $I_{AC}$, prior to multiplication with the duty factor T for modulation, and the setpoint value $I_{DC}$ of the total current $I_{DC\_actual}$ prior to division by the intermediate circuit voltage $U_{ZK}$, are thus limited such that the first manipulated variable $I_{AC}$ assumes a maximum value of the current limit $I_{AC\_limit}$ and the setpoint value $I_{DC}$ assumes a maximum value of the total current limit $I_{DC\_limit}$, wherein commutation K is executed by means of the control unit 2 and the B6 bridge 3, with reference to the limitations applied.

Figure 5:
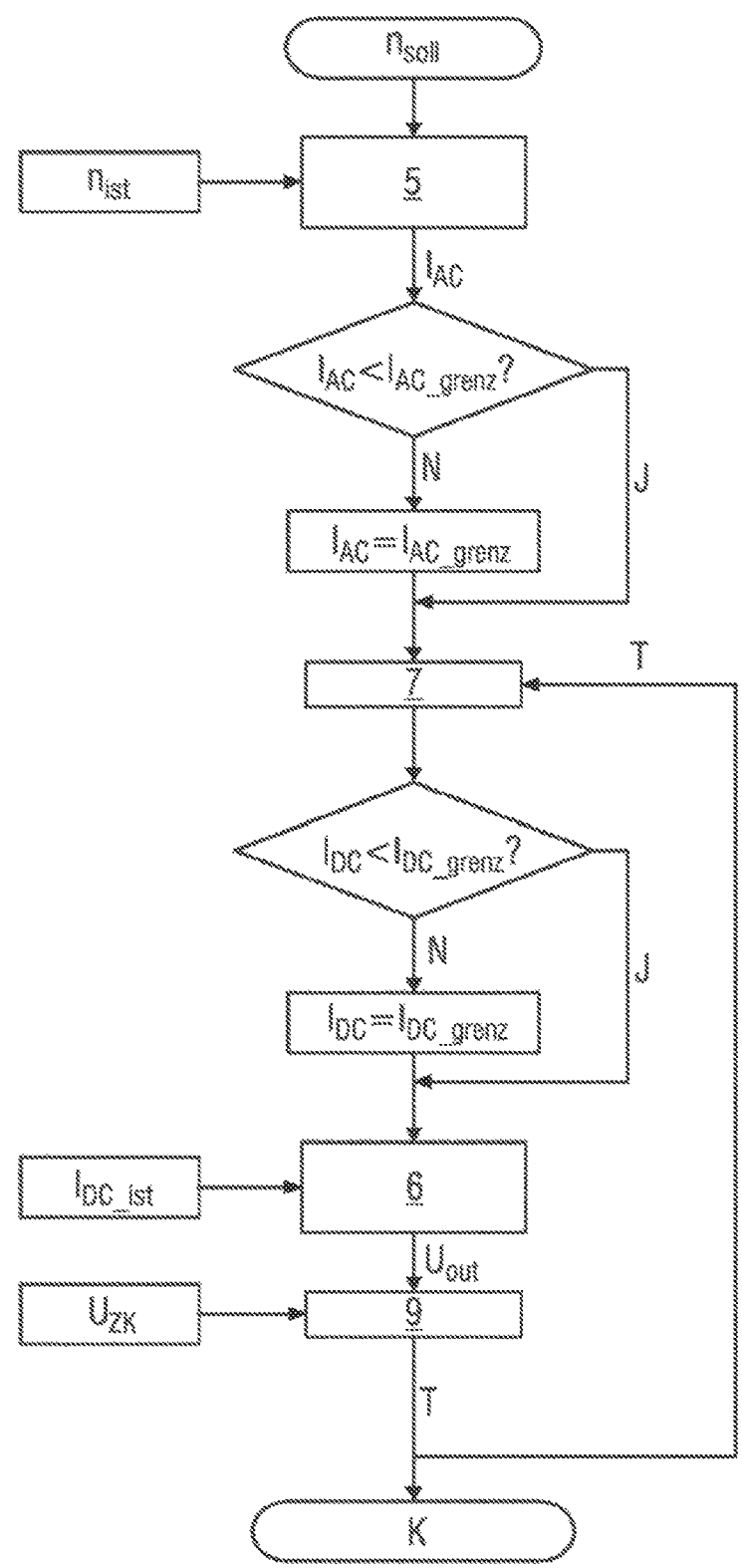
FIG. 5 shows a schematic flow chart of a method according to the invention, with a detailed representation of the generation of a duty factor for modulation.

FIG. 5 shows a flow chart for a potential exemplary embodiment of the method according to the invention wherein, additionally to the representation shown in FIG. 4, the generation of the duty factor T resulting from the division of the second manipulated variable $U_{out}$ by the intermediate circuit voltage $U_{ZK}$ is also represented.

LIST OF REFERENCE SYMBOLS

1 Electric motor
2 Control unit
3 B6 bridge
4 Detection unit
5 Speed controller
6 Current regulator
7 Multiplier
8 Signal processing unit
9 Divider
$I_{AC}$ first manipulated variable
$I_{AC\_limit}$ current limit
$I_{AC\_lim}$ limit value
$I_{DC}$ set point value
$I_{DC\_limit}$ total current limit
$I_{DC\_actual}$ total current
$I_{DC\_lim}$ limit value
J Yes
K Commutation
Min Minimum calculation
N no
$n_{actual}$ actual speed
$n_{setpoint}$ setpoint speed
R1 Resistance
T Duty factor
$U_{out}$ second manipulated variable
$U_{ZK}$ intermediate circuit voltage
φ rotor position angle

The invention claimed is:

1. A method for controlling an operation of an electric motor, which comprises the steps of:
   generating and outputting electrical voltages applied to electrical phases of the electric motor in a controlled manner in a modulation on a basis of a rotor position of the electric motor, on a basis of a set point/actual comparison of a speed of the electric motor executed in a control loop by a speed controller, and on a basis of a set point/actual comparison of a total current measured on an electric power supply unit of the electric motor by a current regulator which is subordinate to the speed controller;
   forming a set point value at an input of the current regulator by multiplying a present duty factor for modulation by a first manipulated variable applied to an output of the speed controller, the first manipulated variable of the speed controller becomes an equivalent phase current root mean square value for the electric motor in the current regulator, by means of multiplication by the present duty factor; and
   limiting the first manipulated variable prior to multiplication with the present duty factor for modulation.

2. The method according to claim 1, wherein the present duty factor is obtained by dividing a second manipulated variable at an output of the current regulator by a maximum available intermediate circuit voltage on the power supply unit.

3. The method according to claim 2, which further comprises generating an equivalent voltage amplitude on the electric motor as the second manipulated variable by the current regulator.

4. The method according to claim 1, which further comprises limiting the set point value.

5. The method according to claim 4, which further comprises executing the limiting of the set point value, prior to the multiplication of the present duty factor for modulation with the first manipulated variable on the output of the speed controller, by a conversion of a total current limit into an equivalent current limit by division with the present duty factor.

6. The method according to claim 1, which further comprises determining the electrical voltages with reference to a rotor position angle which is characteristic of a rotor position of the electric motor, in a space vector modulation.

7. A device for controlling an operation of an electric motor, the device comprising:
   at least one detection unit;
   a power supply unit for a controlled output of electric voltages on electrical phases of the electric motor, said power supply unit is coupled to said least one detection unit for detecting a rotor position of the electric motor;
   at least one speed controller, disposed in a control loop, for an execution of a set point/actual comparison of a speed of the electric motor;
   a current regulator being subordinate to said speed controller for the execution of the set point/actual comparison of a total current measured on said power supply unit; and
   a multiplier disposed on an output of said speed controller, by means of which a set point value on an input of said current regulator is obtained by multiplying a present duty factor for modulation with a first manipulated variable on said output of said speed controller, output such that the first manipulated variable of said speed controller, by means of multiplication with the present duty factor in said current regulator, becomes an equivalent phase current root mean square value of the electric motor, the first manipulated variable being limited prior to multiplication with the present duty factor for modulation.

8. The device according to claim 7, further comprising a divider disposed on an output of said current regulator, by means of said divider the present duty factor is obtained by a division of a second manipulated variable present on said output of said current regulator by a maximum intermediate circuit voltage available on said power supply unit.

9. The device according to claim 8, wherein the second manipulated variable is an equivalent voltage amplitude of the electric motor.

10. The device according to claim 7, wherein said power supply unit has a bridge circuit.

11. The device according to claim 10, wherein said bridge circuit is a B6 bridge circuit.

* * * * *